United States Patent

[11] 3,625,603

| [72] | Inventor | Eric G. Jansons<br>Marietta, Ohio |
|---|---|---|
| [21] | Appl. No. | 827,687 |
| [22] | Filed | May 26, 1969 |
| [45] | Patented | Dec. 7, 1971 |
| [73] | Assignee | Sperry Rand Corporation<br>New York, N.Y. |

[54] MICROFILM READER
1 Claim, 5 Drawing Figs.

[52] U.S. Cl. .................................................. 353/27,
353/22
[51] Int. Cl. ........................................ G03b 23/08
[50] Field of Search .......................................... 353/25, 27,
122, 22, 26, 95, 96, 87; 33/1 M, 23 C; 355/40

[56] References Cited
UNITED STATES PATENTS

| 2,242,735 | 5/1941 | Widess .......................... | 33/76 (X) |
| 2,514,455 | 7/1950 | Putnam ......................... | 33/137 |
| 2,742,705 | 4/1956 | Gelardi .......................... | 33/125 (X) |
| 3,424,524 | 1/1969 | Akiyama et al. ............... | 353/78 |

*Primary Examiner*—Leonard Forman
*Assistant Examiner*—Steven L. Stephan
*Attorneys*—Marshall M. Truex, Frank A. Seemar and Thomas P. Murphy ABSTRACT: This disclosure describes apparatus for projecting photographic images on a viewing screen. An optical path intersects a plane over which a rectangular transparency holder is randomly traversed. One or more segments of filmed images are arranged in a predetermined manner in the holder, whereby manual or automatic manipulation thereof enables an operator to position a selected image in the optical path. The images, presented in a unitized microform sheet having a common geometrical shape, are readily indexed with respect to known coordinate axes of the sheet. By placing the sheet in the holder in a predetermined manner, the sheet becomes positionable in concert with the holder with respect to the optical path. Accordingly, strips of indicia disposed in orthogonal relationship on the holder and the reader frame, and in mutually parallel relationship with the mentioned coordinate axes provide convenient referencing for image selection.

PATENTED DEC 7 1971
3,625,603
SHEET 1 OF 2
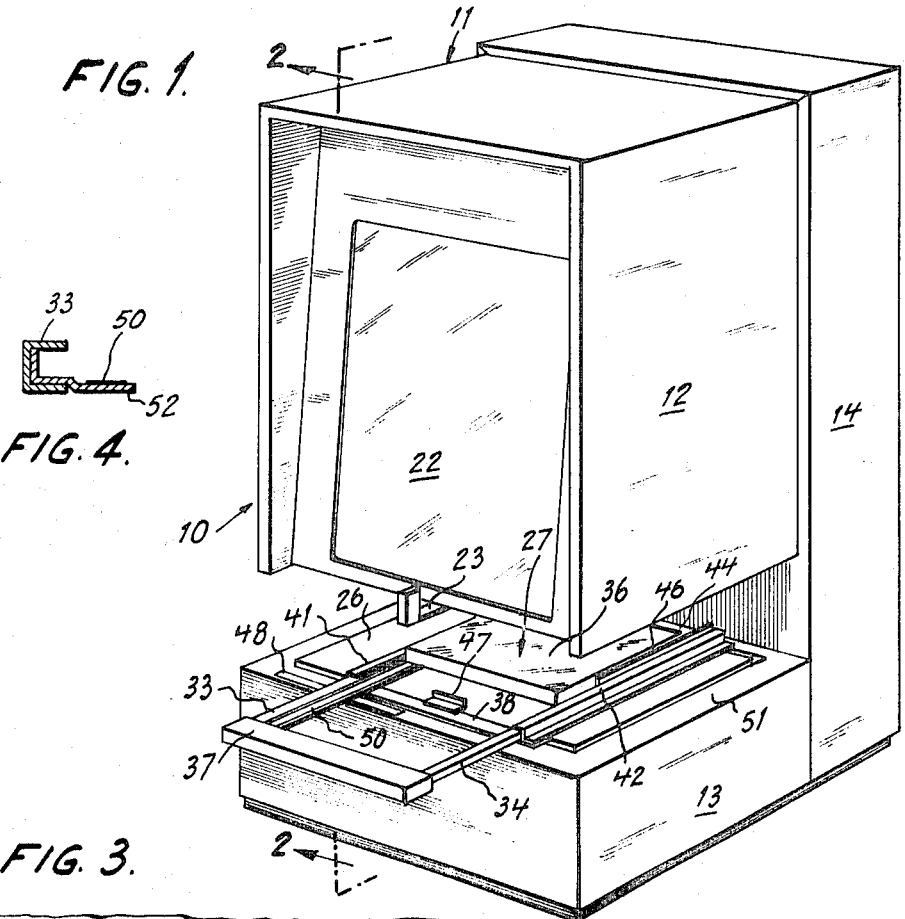
FIG. 1.
FIG. 4.
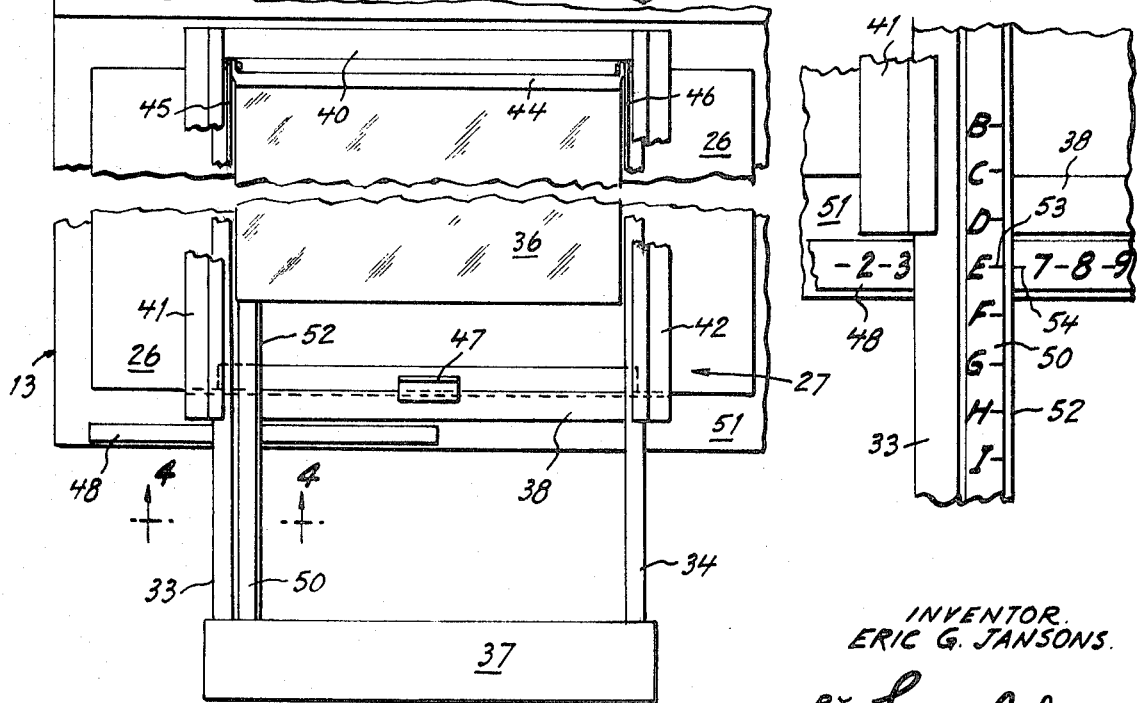
FIG. 3.
FIG. 3a.
INVENTOR.
ERIC G. JANSONS.
BY Frank A. Seemar
ATTORNEY

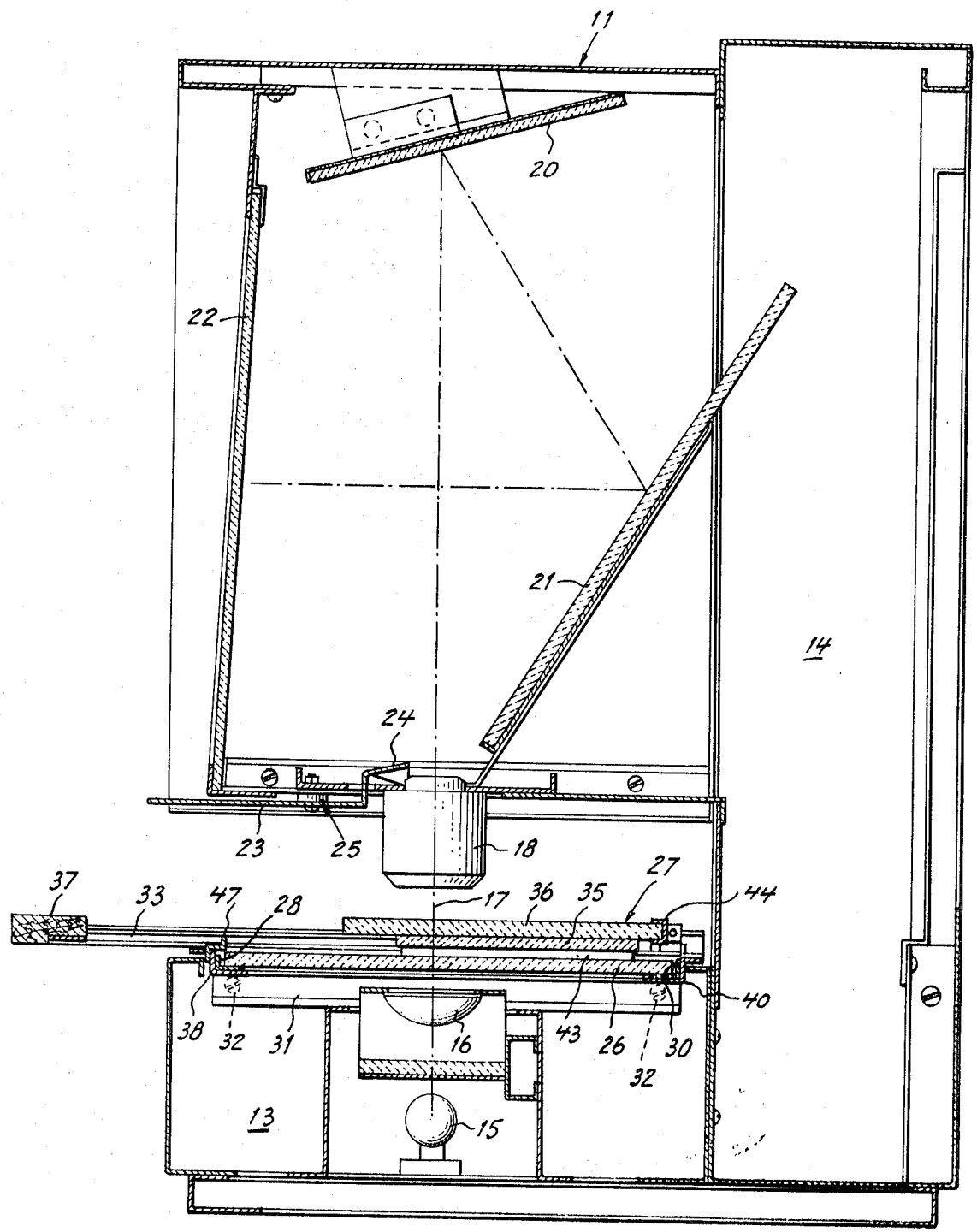

MICROFILM READER

BACKGROUND OF THE INVENTION

It is well known to use manual and automatic mechanisms for positioning filmed images in optical projection apparatus. Viewing arrangements of this nature for positioning unitized microforms, such as microfiche or film jackets, are well known in the projection art and are commonly referred to as microfilm readers. A microfiche (also referred to as a "-Fiche") is a transparent rectangular sheet generally comprising a plurality of individual image frames arranged in a matrix, while film jackets comprises a plurality of parallel pockets for accommodating individual film strips.

Readers generally include an optical system for directing light along a projection path via a lens system, prisms, mirrors, etc., through a filmed image to ultimately focus a magnified image on a viewing screen. A transparent film segment is held by a holder and movable therewith an image plane that intersects the projection path at a distance substantially equal to the focal distance of the lens system. A fine adjustment is usually provided to effect accurate focusing of the displayed image.

More specifically, in microfiche readers, it becomes desirable to index individual image frames for convenient and accurate positioning of a particular frame in the projection path. In a reader without indexing and associated referencing means, the operator is required to visually scan each microform image to sequentially reveal the frame of interest. In many instances, this must be accomplished by identifying associated coded indicia magnified and displayed along with the images. Of course, a portion of other wise available image area is thereby used for coding purposes. Furthermore, valuable time is expended for randomly or sequentially scanning and identifying the viewed indicia projected from the selected sheet. Normally, row-to-row scanning and image-to-image scanning are successively necessary to identify a selected image or the code corresponding thereto.

In present day microfiche sheets it is not uncommon to have varying arrangements or matrices of images disposed on the sheet and accordingly, a more basic problem is encountered in the requirement of providing an indexing system which is uniformly adaptable, regardless of the dimensions of the sheet and/or the arrangement of the image matrix. For example, an indexing system adapted for positioning a 2-inch by 4-inch sheet with 200 frames arranged in a rectangular 10×20 matrix would not properly accommodate a sheet having the same dimensions with 300 frames arranged in a 10×30 matrix. Likewise, variation in sheet size gives rise to a similar lack of compatibility. In conclusion, then it becomes obvious that a microform reader indexing system geared to a particular format is useless when a sheet having a different format is introduced, i.e. a matrix of images arranged in a different pattern or a sheet having different dimensions. Thus, under conditions of variable microform format, readers remain functional but the operation thereof becomes somewhat burdened by the necessity of first determining compatibility between indexing system and format, and secondly, in the event of a lack of compatibility, the operator must then scan the actual frames displayed to locate the proper image as discussed above.

Therefore, it is an object of the present invention to provide new and improved reading apparatus for unitized microforms whereby a particular image frame is accurately positioned in an optical viewing system.

A further object of this invention is to provide a new and improved indexing system that permits accurate determination of the coordinate position of a selected microform frame with respect to a reference scale in an economical and efficient manner.

A still further object of this invention is to provide interchangeable indexing means for convenient microform positioning along reference axes having coordinate compatible with any selected matrix format.

SUMMARY OF THE INVENTION

The present invention contemplates new and useful improvements to optical apparatus for selectively projecting and viewing filmed images. More specifically, the improved apparatus is adapted to handle images presented in a transparent microform having a plurality of image segments arranged in a predetermined pattern.

One embodiment includes a housing, a light source and a projection system enclosed within the housing adapted to direct light from the source through filmed images via an optical path ultimately terminating at an image display screen. The microform being viewed is retained in a holding mechanism mounted for lateral traversal through the optical path at the appropriate focal distance. The apparatus is characterized by a first indexing strip affixed to the housing and a second indexing strip affixed to the traversable holding mechanism, which strips are disposed in adjacent parallel planes in an orthogonal relationship whereby the cooperation thereof in the vicinity of adjacency continuously references the image segment disposed in the optical path.

The foregoing and other objects, features, and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes only and are not to be construed as defining the limits of the invention.

BRIEF DESCRIPTION OF THE DRAWINGS

FIG. 1 is a perspective view of microfilm viewing apparatus embodying the present invention.

FIG. 2 is a sectional view taken along line 2—2 of FIG. 1.

FIG. 3 is a partial plan view showing a portion of the FIG. 1 apparatus in further detail.

FIG. 3a is a partial plan view illustrating one arrangement of indexing indicia contemplated by the present invention.

FIG. 4 is a sectional view taken along line 4—4 of FIG. 3.

DESCRIPTION OF THE PREFERRED EMBODIMENT

Now referring to the drawings, which illustrate a preferred embodiment of the invention, an image projection device in the form of a microfilm reader is shown in FIG. 1 and is generally designated by reference numeral 10. The reader comprises a housing 11 including an upper section 12, a lower section 13, and back section 14 all of which are fabricated from a rigid material such as sheet metal, formed plastic wood, etc. As best illustrated by FIG. 2, lower section 13 houses a lamp 15 and a condensing lens 16 mounted along a vertical projection axis 17. Upper section 12 and back section 14 house the remaining portions of the optical system comprising a projection lens 18, an overhead mirror 20, a rear mirror 21 and a display screen 22. Back section 14 maintains upper and lower sections 12 and 13, respectively, in a predetermined spaced relationship and thereby defines an intermediate open region.

More specifically, back section 14, interconnects the upper and lower sections so that the upper extends over the lower section, substantially in the shape of a "C." Projection lens 18, mounted along projection axis 17, intersects overhead mirror 20, which in turn directs the projection axis onto rear mirror 21. The projection axis is then projected by rear mirror 21 to display screen 22. It will be appreciated by those skilled in the art and others that the foregoing description of a microfilm reader is merely exemplary of projection apparatus well known in the art.

Projection lens 18 cooperates with an arm 23 having a cam end 24 adapted to pivotally adjust lens 18 along axis 17, by virtue of a pivot 25. This adjustment permits the projection lens to be moved toward and away from lamp 15 and condensing lens 16. In this manner, focusing of an image located between the condensing lens 16 and the projection lens 18 is accomplished.

Turning now to a description of the specific embodiment of the invention illustrated in the figures and adapted for use in the foregoing described image projection device, the apparatus comprise a glass plate 26 and a holder 27. The glass plate is relatively thick, i.e., sufficiently thick so that it does not warp or change shape due to the heat generated by lamp 15. The glass plate is horizontally held in a fixed position by resting on the lower portions of a pair of L-shaped brackets 28 and 30. One L-shaped bracket 28 is mounted in front of the glass plate and fixedly attached to the ends of the lower section 13 of housing 11. The second L-shaped member 30 is mounted in the rear of the glass plate and is also fixedly held in lower section 13 of housing 11. Any suitable means may be utilized to attach and retain L-shaped brackets 28 and 30 in lower section 13 of housing 11, such as a cross support member 31, secured along the end wall of housing section 13 by screws 32.

Holder 27 comprises a pair of cross-sectionally U-shaped rails, 33 and 34, a lower glass plate 35, an upper glass plate 36, a handle 37, front and rear Zee-shaped members, 38 and 40, respectively, and, right and left Zee-shaped members, 41 and 42, respectively. Front and rear members 38 and 40, are mounted with the lower flange of the Zee projecting beneath L-shaped support members, 28 and 30. Thus, front Zee-shaped member 38 has its lower element projecting beneath front L-shaped support 28 and rear Zee-shaped member 40 has its lower element projecting beneath rear L-shaped support member 30.

Right and left Zee-shaped members, 41 and 42, are fixedly attached above the front and rear Zee-shaped support members and at right angles thereto whereby the lower projecting flange elements of right and left Zee-shaped members are attached to the upper projecting flanges of the front and rear Zee-shaped members. For example, see contiguous portions of front member 38 and left member 42 in FIG. 1. Hence, the four Zee-shaped members, 38, 40, 41, and 42, form a rectangle when viewed from the top. The right and left Zee-shaped members are mounted with their upper projecting flanges in opposition. Rails, 33 and 34, pass over the upper flanges of the front and rear Zee-shaped members, and inwardly, of the right and left Zee-shaped members in a sliding relationship therewith. Lower plate 35 is secured between rails 33 and 34, as shown. A pair of runners 43 (only one shown), fabricated from a suitable plastic, such as teflon or nylon, is mounted in parallel with the rails and fixedly attached by a suitable adhesive to lower plate 35. When the rails are moved in conjunction with handle manipulation, the runners slide freely over glass plate 26. The foregoing elements are mounted so that runners 43 are pressed against the plate glass while the inward projecting elements of the front and rear carnegie Zee-shaped members are urged upwardly against the lower side of their respective L-shaped support elements.

Upper plate 36 is attached at its rear edge to a bracket 44 which is hinged at its outer ends to upper plate alignment flanges, 45 and 46, that project upwardly from rails, 33 and 34, adjacent to upper plate 36. By this manner of connection, upper plate 36 can be lifted to permit a microfiche, or the like, to be inserted between upper and lower plates, 36 and 35. Hence, a microform is flatly held between upper and lower plates, 36 and 35, respectively.

Handle 37 is attached to rails, 33 and 34, which project outwardly from the overall microform holding structure. A stop element 47 projects upwardly above front Zee member 38 and between the rails. In operation, the handle can be moved inwardly or outwardly with respect to the housing to effect relative motion between the holding mechanism, and accordingly, the microform, with respect to the projection path. Runners, 43, slide over glass plate 26 as handle 37 is moved. Likewise, the handle can be moved to the right or the left resulting in similar relative microform motion to the right or to the left. Again, the runners slide over glass plate 26 as the handle is moved. In this manner, an uncomplicated apparatus is provided for translating a microform in an image projector while maintaining the distance between the microform and the associated projection lens constant. This novel aspect is described in copending patent application bearing Ser. No. 822,231, filed May 6, 1969, entitled "PRECISION PLANER POSITIONING MECHANISM" and assigned to a common assignee.

To facilitate the operation described in the above paragraph, the present invention contemplates the utilization of novel indexing strips 48 and 50, disposed in the unique manner illustrated in FIG. 1. More specifically, as shown in FIGS. 3, 3a, and 4, indexing strip 48 is applied by a suitable adhesive to a platform surface 51 of lower section 13, while indexing strip 50 is applied also by a suitable adhesive to a flange element 52 extending outwardly from U-shaped rail 33 (FIG. 4). Flange element 52 includes a suitable surface disposed in a parallel relationship with platform surface 51 and in convenient adjacency thereto, whereby the strips appear to intersect when an operator views the strip from a normal position in front of image display screen 22.

Indexing strips, 48 and 50, are provided with indicia, an example of which is illustrated in FIG. 3a, corresponding to the coordinates of matrix segments of a microform for which viewing is desired. The adhesive employed to apply the strips to surface 51 and element 52 is such that the strips may be removed and subsequently reapplied for future use. This reapplication may also be accomplished by utilizing rigid strips in combination with transparent pockets disposed on the reader (this embodiment is not shown).

Many advantages are derived from the indexing system disclosed above. Prevalent among these advantages, which are implicitly or explicitly set forth herein, is the flexibility of use and ease of operation. Regardless of the particular microform being used by the operator a standardized indexing strip may be provided for convenient application which corresponds to the arrangement of images. The positioning of indicia is dependent upon, firstly, the shape and dimensions of the corresponding microform and, secondly, an established reference position in which the microform must be disposed in holder 27.

Referring to FIG. 3a, one convenient alpha-numeric indexing code is illustrated. It should be noted that the indexing scheme featured by the present invention permits an operator to manipulate handle 37 and thereby selectively position the microform in optical path 17 by merely observing the position of adjacency of strips, 48 and 50, as the handle and holder is translated, resulting in a relative change in the relationship between their respective mutually perpendicular axes. In the exemplary position (see FIG. 3a), an image, disposed at a segment in the microform having reference coordinates identified by "E–7," has been accurately positioned by noting the alignment of centering marks 53 and 54, whereupon the operator merely transfers his attention to the display screen for viewing of the desired selected image so identified.

Although a specific embodiment of the invention has been illustrated and described in detail by way of example, it is to be understood that the invention is not limited thereto. Various changes may be made in the design and arrangement of parts without departing from the spirit and scope of the invention, as will readily be understood by those skilled in the art.

What is claimed is:

1. Optical apparatus for selectively projecting and viewing filmed images represented in a transparent rectangular microform having a plurality of image segments arranged in a predetermined pattern of side-by-side rows and columns, the combination comprising
   a. a housing,
   b. a light source mounted in said housing,
   c. a projection system within said housing for directing light from said light source through the filmed images, including means for defining an optical path, and an image display screen,
   d. microform holding means comprising upper and lower rectangular transparent plates having mutually parallel front edges and mutually parallel side edges, said plates adapted to receive in sandwich fashion said rectangular microform with the segment rows parallel to said front edges and the segment columns parallel to said side edges, e. said microform holding means further comprising a rectangular frame including front and rear support members, and affixed thereto, left and right frame members, said front and rear support members including opposing flanges extending therefrom, f. said microform holding means still further comprising a pair of parallel rail elements slidably engaging said left and right frame members and secured to the side edges of said lower plate, whereby said frame members and said upper and lower plates are movable in unison inwardly and outwardly with respect to said rectangular frame, g. means for mounting said holding means on said housing comprising, a third transparent rectangular plate having upper and lower surfaces and front and rear edges, said third plate affixed to said housing with the surfaces perpendicular to said optical path, and first and second bracket means adjacent said front and rear edges for slidably engaging respectively said opposing flanges extending said front and rear support members, whereby said microform holding means is movable laterally with respect to said third rectangular plate, h. a first indexing strip affixed to said housing along and adjacent the front edge of said third rectangular plate and having indicia corresponding to the columns of image segments, and i. a second indexing strip affixed to one of said parallel rail elements of said microform holding means in the vicinity of adjacency of such rail and the front edge of said third plate and having indicia corresponding to the rows of image segments, whereby said first and second indexing strips are substantially perpendicular and disposed along axes parallel to the coordinate axes of the rectangular microform, permitting the position of a selected segment to be referenced for viewing on said screen by virtue of the position of said indicia strips, relative to each other.

* * * * *